(12) United States Patent
Binkert

(10) Patent No.: US 11,384,779 B2
(45) Date of Patent: Jul. 12, 2022

(54) CLIP FOR FASTENING A FIRST ELEMENT TO A SECOND ELEMENT

(71) Applicant: A. Raymond et Cie, Grenoble (FR)

(72) Inventor: Sven Binkert, Lörrach (DE)

(73) Assignee: A. Raymond et Cie, Grenoble (FR)

( * ) Notice: Subject to any disclaimer, the term of this patent is extended or adjusted under 35 U.S.C. 154(b) by 25 days.

(21) Appl. No.: 16/093,536

(22) PCT Filed: Apr. 7, 2017

(86) PCT No.: PCT/EP2017/000441
§ 371 (c)(1),
(2) Date: Oct. 12, 2018

(87) PCT Pub. No.: WO2017/178104
PCT Pub. Date: Oct. 19, 2017

(65) Prior Publication Data
US 2019/0136884 A1 May 9, 2019

(30) Foreign Application Priority Data
Apr. 13, 2016 (DE) .......................... 102016004337.7

(51) Int. Cl.
*F16B 2/24* (2006.01)
*F16B 5/06* (2006.01)
(Continued)

(52) U.S. Cl.
CPC .............. *F16B 2/245* (2013.01); *B60R 21/16* (2013.01); *F16B 2/241* (2013.01); *F16B 5/0621* (2013.01); *B60R 21/20* (2013.01)

(58) Field of Classification Search
CPC ...... F16B 2/245; F16B 2/241; F16B 5/02621; B60R 21/16
See application file for complete search history.

(56) References Cited

U.S. PATENT DOCUMENTS 3,769,853 A * 11/1973 Schluckebier ......... B60Q 1/425
74/543
6,976,292 B2 * 12/2005 MacPherson .......... B60N 3/026
24/292
(Continued)

FOREIGN PATENT DOCUMENTS

DE 102012212508 A1 5/2014
DE 102015209881 A1 12/2016
(Continued)

OTHER PUBLICATIONS

Machine assisted English translation of DE102012212508A1 obtained from https://patents.google.com/patent on Sep. 22, 2020, 6 pages.

*Primary Examiner* — Victor D Batson
*Assistant Examiner* — Matthew J Sullivan
(74) *Attorney, Agent, or Firm* — Warner Norcross + Judd LLP

(57) ABSTRACT

The invention relates to a clip for fastening a first element to a second element, wherein the clip has a top (1) and a tip (2) and a first side (4) and a second side (5), wherein the first side (4) extends from the top (1) in the direction of the tip (2), and the second side (5) extends from the top (1) in the direction or the tip (2), wherein a first side wall (10) extends from the first side (4) in the direction of the second side (5), and a second side wall (13) extends from the second side (5) in the direction or the first side (4), wherein the first side wall (10) has a first protruding linger (14), which overlaps a region of the second side wall (13), wherein the first side wall (10) has a second protruding finger, which overlaps another region of the second side wall (13).

12 Claims, 3 Drawing Sheets

(51) Int. Cl.
*B60R 21/16* (2006.01)
*B60R 21/20* (2011.01)

(56) References Cited

U.S. PATENT DOCUMENTS

| | | | | |
|---|---|---|---|---|
| 7,614,590 | B2* | 11/2009 | Boville | E04B 9/20 |
| | | | | 248/72 |
| 8,646,155 | B2* | 2/2014 | Ribes Marti | F16B 2/241 |
| | | | | 24/295 |
| 9,440,596 | B2* | 9/2016 | Huelke | B60N 3/026 |
| 10,408,247 | B2* | 9/2019 | Schulz | F16B 2/245 |
| 10,590,968 | B2* | 3/2020 | Benedetti | F16B 2/243 |
| 10,590,969 | B2* | 3/2020 | Binkert | F16B 2/245 |
| 2006/0102820 | A1* | 5/2006 | Boville | E04B 9/20 |
| | | | | 248/300 |
| 2013/0302087 | A1* | 11/2013 | Binkert | |
| 2015/0300388 | A1* | 10/2015 | Maschat et al. | |
| 2016/0144801 | A1* | 5/2016 | Huelke | B60R 13/0206 |
| | | | | 24/295 |
| 2018/0160837 | A1* | 6/2018 | Middleton | A47H 1/142 |
| 2018/0209454 | A1* | 7/2018 | Binkert | B25B 11/00 |
| 2019/0170172 | A1* | 6/2019 | Jackson, Jr | F16B 19/1081 |

FOREIGN PATENT DOCUMENTS

| | | | |
|---|---|---|---|
| EP | 2404067 | A1 | 1/2012 |
| EP | 2508765 | A1 | 10/2012 |
| WO | 2008099243 | A1 | 8/2008 |
| WO | 2012129233 | A1 | 9/2012 |

* cited by examiner

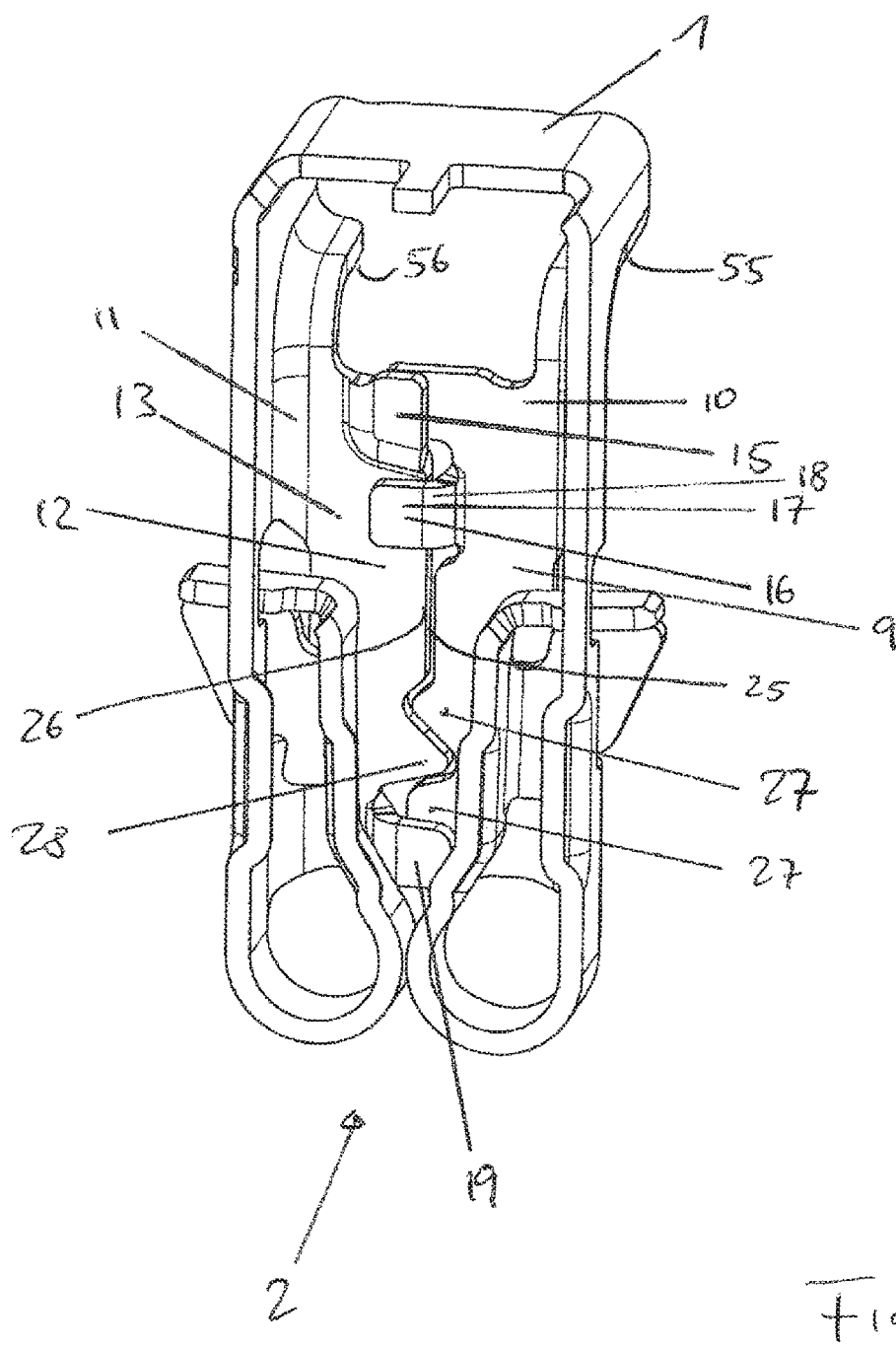

CLIP FOR FASTENING A FIRST ELEMENT TO A SECOND ELEMENT

TECHNICAL FIELD OF THE INVENTION

The invention relates to a clip for fastening a first element to a second element. Furthermore the invention relates to a device with a first element and with a second element fastened on the first element, wherein the first element has a hole and the second element is fastened by a clip on the first element.

BACKGROUND OF THE INVENTION

A clip for fastening a first element to a second element is known from WO 2012/104250 A1. The clip comprises a head and a tip. The clip described in it has a first side (described in it by outer wing 13) and a second side opposite the first side. The first side extends from the head to the tip, which is formed, among other things, by the two vertices of the arched bent sections 15 provided on the end of the first side. Likewise, the second side extends from the head in the direction of the tip, wherein the tip is furthermore formed by the two vertices of two arched, bent sections provided on the end of the second side. In the clip known from WO 2012/104250 A1, a first side wall designated in it by edge wing 21 extends from the first side (from the outer wing 13) in the direction of the second side (in the direction of the outer wing 13 opposite an outer wing 13). Furthermore, a second side wall extends from the second side in the direction of the first side.

EP2 404 067 B1 teaches a clip for fastening a first element to an element, wherein the clip comprises a head and a tip. In the clip known from EP 2 404 067 B1 a first side is provided which extends from the head in the direction of the tip and a second side is provided which extends from the head in the direction of the tip. A first side wall extends from the first side in the direction of the second side and a second side wall extends from the second side in the direction of the first side. The second side wall has in the embodiment described with reference made to FIG. 1 to 4 of EP 2 404 067 B1, which is evaluated there as belonging to the prior art, a first protruding finger which overlaps with a first protruding finger of the second side wall. Furthermore, the first side wall comprises a second protruding finger which overlaps with a second protruding finger of the second side wall. As a novelty, EP 2 404 067 B1 teaches providing a single, protruding finger on the first side wall (designated in it by the reference numeral 9; cf. FIGS. 5 and 6 of EP 2 404 067 B1 which finger overlaps an area of the second side wall. Also, EP 2 404 067 B1 suggests as a novelty forming the second side wall with a single protruding finger which overlaps an area of the first side wall.

BRIEF SUMMARY OF THE INVENTION

Given this background, the present invention has the basic problem of suggesting a clip for fastening a first element to a second element which is more resistant in particular to torsional loading and bending loading of the shaft located between the head and the tip.

This problem is solved by the subject matter of claim 1. Advantageous embodiments are presented in the subclaims and in the following description.

The invention starts from the basic concept of providing not only one first finger protruding from the first side wall and which overlaps an area of the second side wall but also providing a second finger protruding from the first side wall which finger overlaps another area of the second side wall. The invention recognized that the clip shaft can be constructed to be especially stiff to torsion and to bending if two protruding fingers of a first side wall overlap areas of the second side wall.

A "clip" for fastening a first element to a second element denotes a fastening device which comprises at least one first contact surface and at least one second contact surface facing the first contact surface. The first contact surface is provided as a rule on a fixed element of the fastening device whereas the second contact surface is provided on a resilient element of the fastening device. Such fastening devices are provided with a tip for being introduced into a recess, usually a hole, in the first element. The resilient element carrying the second contact surface is pressed in during the pushing in but, after having passed the hole, it springs back into its initial position. The first element is usually constructed as a flat element, for example, as a plate or a sheet of a part of a vehicle frame. However, the first element can also comprise a blind hole with an appropriately selected undercut which makes it possible for the resilient element to rebound after it has passed a narrower part of the hole above the undercut. The second element can be fastened by clamping to the first element, for example, when it is pushed between a head of the clip and a surface of the first element and the distance of the first contact surface which is then provided on the head of the clip and of the second contact surface of the clip is selected in such a manner that it can produce such a clamping given a certain material thickness of the first element and a certain material thickness of the second element. It is also conceivable that the second element also has a hole and the clip is guided with its tip through both holes. It is also conceivable that the second element is fastened on a head of the clip when the latter comprises, for example, a hook or a fastening mushroom anchor or if the second element is simply adhered, welded or fastened in another manner to the head of the clip in a joining manner.

The term "head" of such a clip denotes a widened-out part provided on an end of the clip. The head is as a rule provided for preventing that the clip can be pushed entirely through a hole of the first element. Also, the head is frequently constructed for being able to apply the force to be applied onto the clip for pushing the clip into a hole of the first element. To this end, the clip frequently has a flat surface facing away from the tip. In a preferred embodiment the head is rigidly constructed, wherein "rigid" denotes that no section of the head can move relative to another head, for example, it is resilient. In an alternative embodiment the head comprises a rigid base body on which resilient elements belonging to the head, for example, resilient arms or screen-like sealing lips are provided. In a preferred embodiment the greatest cross-sectional surface of all cross-sectional surfaces of the head is greater in planes vertical to the longitudinal axis of the clip than the greatest cross-sectional surface of all cross-sectional surfaces of the shaft in planes vertical to the longitudinal axis of the clip.

Furthermore, the clip has a tip. "Tip" denotes in the context of this description only the clip end opposite the head. It is provided in a preferred embodiment that a clip shaft extending from the head in the direction of the tip tapers. However, this is not obligatorily necessary. A tip in the context of this description can also be a blunt end to be provided in a conceivable embodiment on the end of a shaft opposite the head. In a preferred embodiment the tip can run to a point like a pyramid or a cone or a truncated pyramid or a truncated cone. Also, the tip can be formed by the ridge of a roof-shaped end section of a shaft extending from the head to the tip. However, this is not obligatorily necessary. The tip can be formed by a single section of the clip. However, in a preferred embodiment the tip is formed from several partial sections of the clip, for example, by the four vertices of the arched, bent sections 15 such as they are shown in WO 2012/104250 A2 or the two vertices of the arched sections of the embodiments shown in FIG. 1, 2, 7, 8, 9, 10 of EP 2 404 067 B1.

The clip comprises a shaft optionally composed of several parts between the head and the tip. The clip has a longitudinal axis extending from the head to the tip. The shaft is in particular preferably longer in its longitudinal extension facing from the head to the tip than in a direction of width facing vertically to the longitudinal extension. The longitudinal axis of the clip especially preferably faces in the direction of the longitudinal extension of the shaft. In a preferred embodiment the clip is constructed with mirror symmetry regarding a plane containing the longitudinal axis of the clip. In an alternative embodiment the clip is designed with rotational symmetry in such a manner that it has at least one plane which contains the longitudinal axis of the clip in which each section of the clip which is located on a side of this plane can be brought by a rotation through 180° around the longitudinal axis in coincidence with an identically formed section of the clip on the other side of this plane.

The clip has a first side which extends from the head in the direction of the tip. The clip comprises a shaft optionally also formed from several elements of the clip. This shaft has a first side which expends from the head in the direction of the tip. Also, this shaft has second side extending from the head in the direction of the tip. In an especially preferred embodiment the first side extends from the head to the tip, wherein sections of the clip follow the tip-side end of the first side which sections contribute to form the tip. In an especially preferred embodiment the second side extends from the head to the tip, wherein sections of the clip follow the tip-side end of the second side which sections contribute to the forming of the tip. However, even structural forms are also conceivable in which the clip shaft begins, starting from the head with a first side and a second side which extend in the direction of the head but then other clip sections are provided, in particular facing in other directions in particular relative to the extension of the first side and/or then, however, other sections of the clip facing in other directions in particular relative to the extension of the second side are provided between the second side and the clip sections forming the tip.

In a preferred embodiment the first side wall and the second side wall are arranged in alignment. The term "aligned" preferably denotes in particular that the first side wall has a surface facing outward and the second side wall has a surface facing outward and that the outwardly facing surface of the first side wall and the outwardly facing surface of the second side wall are arranged in a plane. In a preferred embodiment the first side wall and the second side wall are arranged on the same side of a plane containing the longitudinal axis of the clip.

The clip according to the invention comprises a first side wall extending from the first side in the direction of the second side. In an especially preferred embodiment the clip comprises a third side wall which also extends from the first side in the direction of the second side, wherein the first side wall extends from a first edge of the first side in the direction of the second side and the third side wall extends from a second edge of the first side which edge is opposite the first edge in the direction of the second side. In an especially preferred embodiment the clip has a fourth side wall which also extends from the second side in the direction of the first side, wherein the second side wall extends from a first edge of the second side in the direction of the first side and the fourth side wall extends from a second edge of the second side, which second edge is opposite the first edge, in the direction of the first side. In a preferred embodiment the third side wall and the fourth side wall are arranged aligned. The term aligned denotes in an especially preferred manner that the third side wall has an outwardly facing surface and the fourth side wall has an outwardly facing surface and that the outwardly facing surface of the third side wall and the outwardly facing surface of the fourth side wall are arranged in one plane. In a preferred embodiment the first side wall is constructed parallel to the third side wall and/or the second side wall is constructed parallel to the fourth side wall.

As was previously explained, the clip can be designed with mirror symmetry relative to a plane containing the longitudinal axis of the clip. In such an embodiment the third side wall is constructed like the first side wall and the fourth side wall is constructed like the second side wall so that the following explanations of features of the first side wall are also explanations of features of the third side wall and the following explanations of the features of the second side wall are also explanations of features of the fourth side wall. However, as was previously explained, the clip can also be designed with rotational symmetry in such a manner that there is at least one plane which contains the longitudinal axis of the clip in which each section of the clip located on one side of this plane can be brought by a rotation of 180° about the longitudinal axis in coincidence with an identically constructed section of the clip on the other side of this plane. In such an embodiment the third side wall is constructed like the second side wall and the fourth side wall is constructed like the first side wall so that the following explanations of features of the first side wall are also explanations of features of the fourth side wall and the following explanations of features of the second side wall are also explanations of features of the third side wall.

In the description, the immediate area around the longitudinal axis of the clip and/or the space enclosed by the first side, by the second side and by the first side wall and by the second side wall and—to the extent present—the space enclosed by the third side wall and the fourth side wall is/are understood as the interior of the clip. To the extent that outwardly facing surfaces are discussed in this description or the concept "outwardly" is used in another manner, this means a direction which faces away from the longitudinal axis of the clip.

In the clip according to the invention the first side wall comprises a first protruding finger which overlaps an area of the second side wall and comprises a second protruding finger which overlaps another area of the second side wall. In the context of this description a finger overlaps an area of a side wall if at least a part of the finger is arranged in such a manner that it intersects a plane normal of a surface of this area and/or a line vertical to a longitudinal axis of the finger intersects the area of the side wall. It is not obligatorily necessary for the success of the invention that a surface of the finger is in contact with a surface of the area of the side wall with which the finger overlaps. However, in a preferred embodiment a surface of the finger makes contact with the surface of the area of the side wall with which it overlaps.

In a preferred embodiment the length of the finger is greater than the width of the finger, wherein the direction of the extension of the finger from the first side wall in the direction of the second side wall is understood as length. In addition to the width standing vertically to the length, the finger has especially preferably a height which is given as a rule by the material thickness and can also be designated as thickness. In a preferred embodiment the width of the finger is greater than the height (thickness) of the finger. In a preferred embodiment the direction of the width of the finger extends parallel to the longitudinal axis of the clip and/or the longitudinal direction of the finger runs vertically to the longitudinal axis or vertically to a line running parallel to the longitudinal axis.

In a preferred embodiment the first side wall comprises a base body from which the first, protruding finger protrudes and the second, protruding finger protrudes. The base body has a length in an especially preferred manner wherein the length denotes in particular the extension of the base body from the first side in the direction of the second side. In a preferred embodiment the first side merges via an edge into the first side wall. The length is an understood to be in particular the maximum extension of the base body from this edge in the direction of the second side. As a supplement or alternative, the longitudinal direction of the base body extends vertically to the longitudinal axis of the clip or vertically to a line running parallel to the longitudinal axis of the clip. The base body also has a width in an especially preferred manner which extends in an especially preferred manner in a direction parallel to the longitudinal axis of the clip. Furthermore, the base body has a height which can also be designated as thickness and is usually given by the material thickness. In a preferred embodiment the width of the base body is greater than the length of the base body.

In a preferred embodiment the width of the first protruding finger and/or the width of the second protruding finger is smaller than the width of the base body. In a preferred embodiment the width of a protruding finger is smaller than one half the width of the base body, especially preferably less than one third and especially preferably smaller than one fourth of the width of the base body.

In a preferred embodiment the width of the first protruding finger is equal to the width of the second protruding finger. In a preferred embodiment the distance of the end of the first protruding finger to the second side is equal to the distance of the second protruding finger to the second side.

In a preferred embodiment the width of the base body of the first side wall and/or the width of the base body of the second side wall is/are greater than 40%, especially preferably greater than 50%, in particular greater than 60%, especially preferably greater than 70% and especially preferably greater than 80% of the extension of the clip shaft.

In a preferred embodiment the length of the protruding finger is smaller than the maximum length of the base body. In an alternative embodiment the length of the protruding finger is equal to the maximum length of the base body. In an alternative embodiment the length of the protruding finger is greater than the maximum length of the base body.

In a preferred embodiment the first side merges via an edge into the first side wall, wherein this edge is interrupted by a recess. In a preferred embodiment a clip element resiliently pretensioned in an outward direction extends from the interior through the recess outward. The term pretension outward also denotes an embodiment in which the pretensioned element has a rest position in which it protrudes from a partial area of the shaft, for example from a side of the shaft and from which it can be moved out under the action of force, especially preferably in the direction vertically to the shaft axis (longitudinal axis) or in a direction running parallel to a line vertical to the shaft axis (longitudinal axis). The pretensioned element is especially preferably connected to a resilient element or is part of a resilient element so that it must be moved out of the rest position under the action of force against an increasing resilient force and the resilient force brings it about that the projection returns into its rest position after the removal of the action of force. In a preferred embodiment the rest position is the position in which the resilient element exerts no force. The rest position can be but not have to be defined by a stop against which the resilient element presses or draws the pretensioned element. In a preferred embodiment the second side merges via an edge into the second side wall, wherein this edge is interrupted by a recess. In a preferred embodiment a clip element resiliently pretensioned in an outward direction extends from the interior through the recess outward.

In a preferred embodiment the first side merges via an edge into the first side wall, wherein the edge extends in a direction parallel to the longitudinal axis of the clip. In a preferred embodiment the second side merges via an edge into the second side wall, wherein the edge extends in a direction parallel to the longitudinal axis of the clip.

In a preferred embodiment the area of the second side over which the first protruding finger of the first side wall overlaps is adjacent to the area of the second side over which the second protruding finger of the first side wall overlaps. The first protruding finger of the first side wall and the second protruding finger of the first side wall are especially preferably arranged adjacent to one another.

The first protruding finger of the first side wall is especially preferably closer to a first end of a base body of the first side wall (viewed in the direction of width of the side wall) than it is to an opposite, second end of the base body. The first end is especially preferably the base body end which is closer to the head. As a supplement or an alternative, the second protruding finger of the first side wall is closer (viewed in the direction of width of the side wall) to the second end of the base body of the first side wall than it is to the opposite, first end of the base body. The second end is especially preferably the base body end closer to the tip.

In a preferred embodiment the first side wall comprises a flat base body. In a preferred embodiment the second side wall comprises a flat base body. The term flat base body denotes especially preferably a base body which has a flat outer surface which is especially preferably arranged in a plane. The flat base body additionally comprises in an especially preferred manner a uniform height (thickness). It is conceivable that a flat base body designated here as flat has dense, for example, small or guide ribs or indentations or depressions. Even such a base body provided with purposely selected, singular deviations from the purely geometrically flat shape is understood in the present description as a flat base body. If the flat base body purposely has selected, singular deviations from the purely geometrically flat shape, for example, dents, for example, small nubs or guide ribs or indentations or depressions, in a preferred embodiment the area occupied by the singular deviation in the plane which comprises the otherwise geometrical flat surface of the base body is less than 30%, especially preferably less than 20%, especially preferably less than 10% of the area of the remaining, geometrically flat surface. If the flat base body purposely has several selected, singular deviations from the purely geometrically flat shape, for example dents, small nubs or guide ribs or indentations or depressions, then in a preferred embodiment the surface occupied by each singular deviation in the plane which occupies the otherwise geometrical, flat surface of the base body is less than 30%, especially preferably less than 20%, especially preferably less than 10% of the area of the remaining, geometrically flat surface. If the flat base body purposely has several selected, singular deviations from the purely geometrically flat shape, for example dents, small nubs or guide ribs or indentations or depressions, then in a preferred embodiment the sum of all surfaces occupied by the singular deviations in the plane which the otherwise geometrically flat surface of the base body occupies is less than 30%, especially preferably less than 20%, especially preferably less than 10% of the area of the remaining, geometrically flat surface. In a preferred embodiment the flat base body is entirely flat even in the geometrical sense and has no singular deviation from the purely geometrically flat shape.

In a preferred embodiment the first finger is aligned with a flat base body of the first side wall. The outwardly facing surface of the finger is especially preferably in a plane with the outwardly facing surface of the base body. In a preferred embodiment the protruding finger additionally has the same material thickness (thickness; height) as the base body. There is especially preferably no bending section between the base body and the first protruding finger.

In an especially preferred embodiment the first side wall has a flat base body, wherein the second protruding finger as an outwardly or inwardly arched bent end section. In a preferred embodiment the second protruding finger has an end section running parallel to the flat base body. This denotes in an especially preferred manner that the end section of the second finger has an outwardly facing surface running in a plane which optionally runs parallel to a plane in which the outwardly facing surface of the base body extends. In an especially preferred manner, the end section of the second protruding finger additionally has the same material thickness as the base body. In a preferred embodiment a bent section is present between the base body and the end section of the second finger. In an especially preferred manner, the bent section is constructed as a double bend which is first bent in a first direction and is then bent in the further course in another direction.

In a preferred embodiment the second side wall comprises a receptacle for receiving the first, protruding finger. The term receptacle denotes in particular a depression in a base body of the second side wall or a section of the side wall which extends offset in a parallel manner to a flat base body of the side wall, wherein the transition between the flat base body and the section offset in a parallel manner is preferably formed by a channel. A start is to be made here from the fact that the section provided and offset in a parallel manner is not be constructed to be aligned in a perfectly parallel manner for technical manufacturing reasons and therefore can also possibly stand at an angle to the flat base body. Also, it may not be possible for technical reasons of manufacture to shape the section which is offset in a parallel manner and running at an angle to be perfectly level. In an especially preferred embodiment the first protruding finger of the first side wall is aligned with a flat base body of the second side wall. In order to make possible in such an embodiment an overlapping of the first protruding finger of the first side wall with an area of the second side wall, the area of the second side wall with which a first protruding finger constructed in such a manner overlaps is formed by a receptacle of the second base body which receptacle is designed as a setoff or a pocket or as a depression.

In a preferred embodiment the second side wall comprises at least one protruding finger which overlaps an area of the first side wall. In a preferred embodiment the protruding finger of the second side wall is designed like the second protruding finger of the first side wall.

In a preferred embodiment the first side wall comprises a flat base body, wherein a narrow side of the base body faces the first side of the second side wall, wherein the second side wall has a flat base body, wherein a narrow side of the base body of the second side wall faces the first side wall. In a preferred embodiment the narrow side of the base body extends at a right angle to an outwardly facing surface of the base body. In this preferred embodiment the narrow side of the first wall and/or the narrow side of the second side wall is constructed to be level at least in sections. In a preferred embodiment the narrow side of the first wall extends in a plane which runs parallel to the longitudinal axis or contains the longitudinal axis of the clip and/or the narrow side of the second side wall of a plane which runs parallel to the longitudinal axis or the longitudinal axis of the clip.

In a preferred embodiment the first protruding finger overlaps an area of the base body of the second side wall which borders the level narrow side of the second side wall, and/or the second protruding finger overlaps an area of the base body of the second side wall which borders the level narrow side of the second side wall.

In a preferred embodiment the first side wall comprises a flat base body and a narrow side which is level in a first section, wherein the level section of the narrow side extends in a direction parallel to the longitudinal axis of the clip. In this embodiment the base body comprises, following the level section of the narrow side, a projection which protrudes in the direction of the second side wall. In a preferred embodiment the projection engages into a setoff provided in the second side wall. In a preferred embodiment the second side wall comprises a flat base and a narrow side which is level in a first section, wherein the setoff follows the level section of the narrow side. As a supplement or an alternative, the second side wall comprises a flat base body and a narrow side level in a first section, wherein the level section of the narrow side extends in a direction parallel to the longitudinal axis of the clip. In this embodiment the base body comprises, following the level section of the narrow side, a projection protruding in the direction of the first side wall. In a preferred embodiment the projection engages into a setoff which is provided in the first side wall. In a preferred embodiment the first side wall has a flat base body and a narrow side level in a first section, wherein the setoff follows the level section of the narrow side. These projections are not protruding fingers because they do not overlap with an area of the opposite side wall. A togging can be generated by this cooperation of projections and offsets on the narrow sides of the base bodies of the side walls which elevates the rigidity of the clip because it prevents relative movements of the base bodies of the side walls in the direction parallel to the longitudinal direction of the clip.

In a preferred embodiment an arc is provided on an end of the first side, wherein the vertex of the arc on the end of the first side forms a part of the clip tip and/or an arc is provided on an end of the second side, wherein the vertex of the arc on the end of the second side forms a part of the clip tip. The arc can be designed inwardly starting from the side, as is provided, for example, in the bent-over section 15 in WO 2012/104205 A1. The arc can also be bent outwardly.

In a preferred embodiment the first side has a flat base body which extends from the head in the direction of the tip, and the first side wall has a flat base body standing at an angle to the flat base body of the first side, in particular preferably at an angle between 45° and 135°, especially preferably at an angle of 90°.

In a preferred embodiment the second side comprises a flat base body extending from the head in the direction of the tip, and the second side wall comprises a flat base body which stands at an angle to the flat base body of the second side, in particular preferably at an angle between 45 and 135°, especially preferably at an angle of 90°.

In a preferred embodiment the flat base body of the first side is aligned parallel to the flat base body of the second side. In a preferred embodiment the clip comprises a first side with a flat base body, a second side aligned parallel to the first side and with a flat base body, a first side wall with a flat base body which extends at an angle from the first side to the second side, a second side wall with a flat base body which extends from the second side in the direction of the first side, wherein the first side wall is constructed aligned with the second side wall, and a third side wall with a flat base body which extends at an angle from the first side to the second side, and a fourth side wall with a flat base body which extends from the second side in the direction of the first side, wherein the third side wall is constructed aligned with the fourth side wall. Such an embodiment can have a cross section in the shape of a rectangular ring in a cross section vertical to the longitudinal axis of the clip, which ring is interrupted only by a slot between the first side wall and the second side wall and by a slot between the third side wall and the fourth side wall.

In a preferred embodiment a clip surface is provided which protrudes from the first side and which is at a distance from the head and which faces the head. This clip surface is especially preferably provided on a resilient element which is pretensioned in the outward direction. The term pretensioned outward also denotes here an embodiment in which the pretensioned element has a rest position in which it protrudes from a partial area of the shaft, for example, from a side of the shaft, and from which it can be moved out under the action of force, especially preferably in a direction vertically to the shaft axis (longitudinal axis), or a direction running parallel to a vertical line onto the shaft axis (longitudinal axis). The pretensioned element is especially preferably connected to a resilient element or part of a resilient element so that it must be moved under the action of force against an increasing resilient force out of the rest position and the resilient force brings it about that the projection returns into its rest position after the removal of the action of force. In a preferred embodiment the rest position is the position in which the resilient element exerts no force. The rest position can be but not have to be defined by a stop against which the resilient element presses or draws the pretensioned element. This resilient element extends especially preferably through a recess provided on the first side and/or in the transition from the first side to the first side wall. In a preferred embodiment a clip surface is provided which protrudes from the second side and is at a distance from the head and faces the head. In an especially preferred manner, this clip surface is provided on a resilient element which is pretensioned in an outward direction. The term outward pretension also denotes here an embodiment in which the pretensioned element has a rest position in which it protrudes from a partial area of the shaft, for example, from a side of the shaft and from which it can be moved out under the action of force, especially preferably in a direction vertical to the shaft axis (longitudinal axis) or runs in a direction parallel to a vertical line onto the shaft axis (longitudinal axis). In an especially preferable manner, the pretensioned element is connected to a resilient element or a part of a resilient element so that it must be moved under the action of force against an increasing resilient force out of the rest position and the resilient force brings it about that the projection returns into its rest position after the removal of the action of force. In a preferred embodiment the rest position is the position in which the resilient element exerts no force. The rest position can be but not have to be defined by a stop against which the resilient element presses or draws the pretensioned element. This resilient element extends in an especially preferred manner through a recess provided on the second side and/or in the transition from the second side to the second side wall. In a preferred embodiment four clip surfaces are provided, two of which protrude from the first side and two of which protrude from the second side and each of which is at a distance from the head and faces the head and in an especially preferred manner are each provided on a resilient element which is pretensioned in an outward direction. The term outward pretension also denotes here an embodiment in which the pretensioned element has a rest position in which it protrudes from a partial area of the shaft, for example, from the side of the shaft and from which it can be moved out under the action of force, especially preferably in the direction vertical to the shaft axis (longitudinal axis) or a direction running parallel to a vertical line onto the shaft axis (longitudinal axis). In an especially preferred manner, the pretensioned element is connected to a resilient element or part of a resilient element so that it must be moved out of the rest position under the action of force against in increasing resilient force and the resilient force brings it about that the projection returns after the removal of the action of force back into its rest position. In a preferred embodiment the rest position is the position in which the resilient element exerts no force. The rest position can but does not have to be defined by a stop against which the resilient element presses or draws the pretensioned element.

In a preferred embodiment a resilient element comprising the clip surface has a bevel. The bevel can be constructed in such a manner that the bevel tapers in the direction of the tip. This makes it possible that the resilient element comes in contact during the pushing in of the clip with the tip into a hole of an element with the edge limiting the hole and is pressed inward by this edge counter to the resilient pretension.

In a preferred embodiment the clip head has a head surface which faces the clip surface. In an especially preferred embodiment the clip surface runs parallel to the head surface when the resilient element is in its starting position, that is, is outwardly resilient. In a preferred embodiment the head surface is formed on a stationary area of the head. In an alternative embodiment the head comprises resilient arms that can spring in a direction parallel to the longitudinal direction of the clip, wherein the head surface is provided on a section of the arm, preferably on an end section of the arm.

In a preferred embodiment the head and the first side and the first side wall and the second side and the second side wall are all parts of a one-piece element which produced by bending sections of a metallic section. It is also conceivable to produce the clip according to the invention from plastic, for example, by injection molding.

According to another aspect of the invention which can also be combined with the previously described first aspect, a clip is suggested for fastening a first element to a second element, wherein the clip comprises
  a head and a tip and a first side and a second side, wherein the first side extends from the head in the direction of the tip and the second side extends from the head in the direction of the tip, wherein a first side wall extends from the first side in the direction of the second side, wherein the head comprises a side surface and a contact surface facing the tip, and the side surface of the head merges via a first rounded edge into the head contact surface facing the tip and the first side merges via a second rounded edge into the first side wall and the first rounded edge merges via an arched section into the second rounded edge.

In an especially preferred embodiment in the previously described first aspect of the invention the first structural component is constructed in such a manner that the first structural component comprises a head and a tip and a first side and a second side, wherein the first side extends from the head in the direction of the tip and the second side extends from the head in the direction of the tip, wherein the first side wall extends from the first side in the direction of the second side, wherein the head has a side surface and a contact surface facing the tip, and the side surface of the head merges via a rounded edge into the head contact surface facing the tip, and/or the first side merges via a rounded edge into the first side wall.

The use of the rounded edges avoids tips, offsets or edges in these areas which can lead to damage to the connecting elements. In particular in the embodiment in which the side surface of the head merges via a first rounded edge into the head contact surface facing the tip and the first side merges via a second rounded edge into the first side wall and the first rounded edge merges via an arched section into the second rounded edge the risk of damage to the two elements to be connected can be sharply reduced.

In a preferred device the side surface of the head is aligned with the first side.

In a preferred embodiment the rounded edge via which the first side merges into the first side wall extends in a direction parallel to the longitudinal axis (shaft axis) of the clip whereas the rounded edge with which the side surface of the head merges into the head contact surface facing the tip extends in a direction which is at an angle, especially preferably vertically to the direction in which the rounded edge extends with which the first side merges into the first side wall. The rounded edge is especially preferably constructed in an arch in a cross section vertically to the line in which the edge extends.

The arched section with which the first rounded edge merges into the second rounded edge like a channel is especially preferred.

In a preferred embodiment the head contact surface facing the tip merges via an arched section into the first side wall.

In an especially preferable manner, the clip according to the invention is used for fastening an element (the second element) to a body part (the first element) of a vehicle, in particular preferably to the frame of a vehicle. In an especially preferred manner, the clip is used for fastening a panel (second element) to the frame of a vehicle (first element). In an especially preferable manner, the clip is used to fasten an airbag to a body part, especially preferably a vehicle frame.

The device according to the invention comprises a first element and a second element fastened to the first element, wherein the first element has a hole and the second element is fastened by a clip according to the invention on the first element, wherein the clip extends through the hole in such a manner that the clip head is arranged on one side of the first element and the clip tip is arranged on the opposite side of the element. In a preferred embodiment the clip extends through the hole in such a manner that the clip head is arranged on one side of the first element and a clip surface of the clip is arranged on the opposite side of the element. In a preferred embodiment the first element is a body part of the vehicle, preferably a vehicle frame. In a preferred embodiment the second element is a panel or an airbag.

BRIEF DESCRIPTION OF THE SEVERAL VIEWS OF THE DRAWINGS

The invention will be explained in detail in the following using only one exemplary embodiment of the invention. In it FIG. 3 shows a sectional, perspective side view of the clip according to the invention.

DETAILED DESCRIPTION OF THE INVENTION

Figure 1:
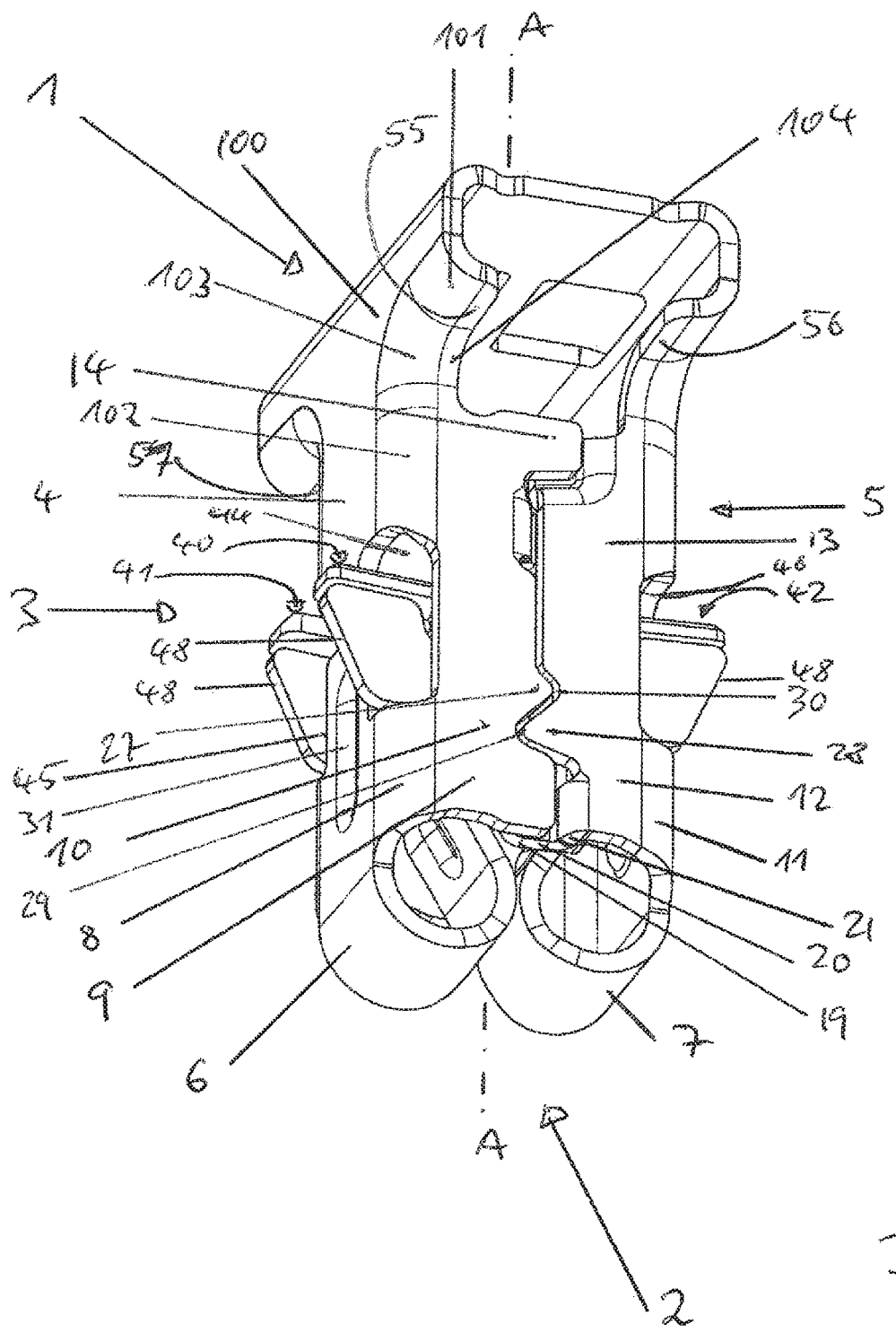
FIG. 1 shows a perspective side view from obliquely below of the clip according to the invention.

The clip shown in the FIG. for fastening a first element on a second element comprises a head 1 and a tip 2. A shaft 3 composed of several partial sections extends between the head 1 and the tip 2.

The shaft 3 has a first side 4 and a second side 5 arranged oppositely, relative to the first side 4, on a longitudinal axis A of the clip and running parallel to the first side 4. The first side 4 as well as the second side 5 extend from the head 1 in the direction of the tip 2. The first side 4 ends in an arched bent section 6 which is bent inward starting from the first side 4. The vertex of the arch of the bent section 6 forms a part of the tip 2. The second side 5 ends in an arched bent section 7 which is bent inward. The vertex of the arch of the bent section 7 forms a part of the clip tip 2.

The first side 4 merges via an edge 8 into the flat base body 9 of a first side wall 10 extending from the first side 4 in the direction of the second side 5. The second side 5 merges via an edge 11 into the flat base body 12 of a second side wall 13 extending from the second side 5 in the direction of the first side 4.

The clip shown in the FIGS. is constructed with mirror symmetry relative to a plane containing the longitudinal axis A and running parallel to the base body 9 and to the base body 12. Therefore, a third side wall 50 (not shown in FIG. 1) extends from the side 4 in the direction of the second side 5, wherein the third side wall 50 is constructed in accordance with the first side wall 10. Furthermore, a fourth side wall 51 not shown in the FIG. 1 extends from the second side 5 in the direction of the first side 4, wherein the fourth side wall 51 is constructed in accordance with the second side wall 13. The clip according to the invention in the embodiment shown in the FIGS. is a one-piece element and was produced by bending sections of a metallic section.

The first side wall comprises a first protruding finger 14 which overlaps an area of the second side wall 13. To this end the second side wall 13 has the receptacle, which can be better seen in FIG. 3, in the shape of a depression 15. Furthermore, the first side wall 10 comprises a second protruding finger 16 (cf. FIG. 3). This second protruding finger 16 of the first side wall 10 overlaps another area of the second side wall 13. The first protruding finger 14 of the first side wall is aligned here with the flat base body 9 of the first side wall, whereas the second protruding finger 16 is bent inward and extends behind the second side wall 13. To this end the second finger 16 has a bent section 18 provided between the flat base body 9 and the end section 17 of the second finger 16 and which is at first bent inward and is then bent in the opposite direction so that the end section 17 of the finger 16 runs parallel to the base body 12 of the second side wall 13. The second side wall 13 comprises a protruding finger 19 which overlaps an area of the first side wall 10. The protruding finger 19 of the second side wall 13 is constructed comparable to the second protruding finger 16 in the first side wall and has an end section 20 which runs parallel to the base body 9 of the first side wall and has a bent section 21 which is provided between the base body 12 of the second side wall 13 and the end section 20.

Figure 2:
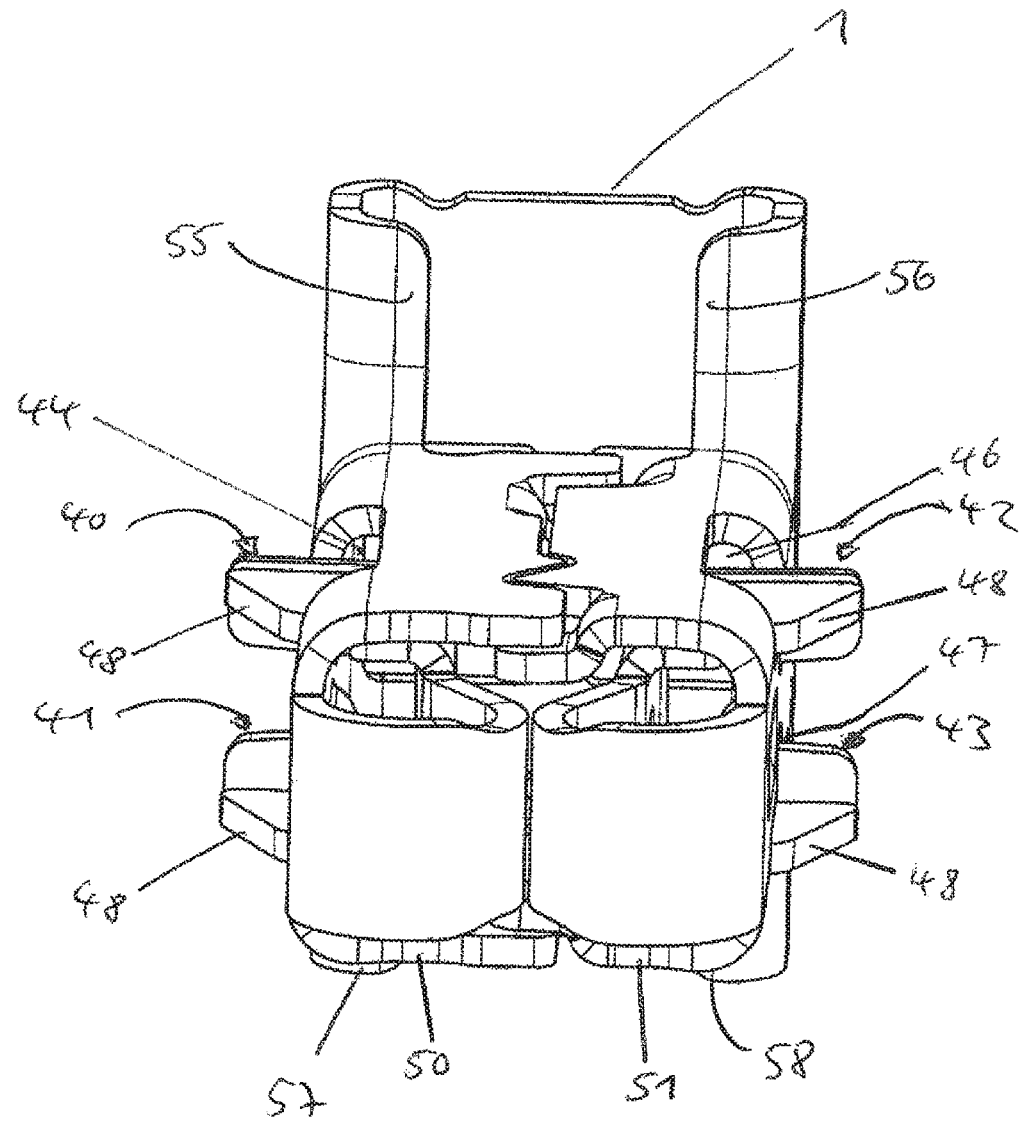
FIG. 2 shows a perspective view from below of the tip of the clip according to the invention.

The base body 9 of the first side wall 10 has a narrow side 25. The base body 12 of the second side wall 13 has a narrow side 26. The narrow side 25 and the narrow side 26 are designed plane over a first section and run substantially parallel to one another in the section, wherein the plane section of the narrow side 26 of the second side wall 13 is longer than the plane section of the narrow side 25 of the first side wall 10. The second protruding finger 16 overlaps an area of the base body 12 of the second side wall 13 which borders the plane section of the narrow side 26 of the second side wall. In the area in which the second protruding finger 16 extends behind the base body 12 of the second side wall 13, the latter comprises a plane section of the narrow side 26. As can be especially well seen in the FIGS. 1 and 2, the plane section of the narrow side 25 and the plane section of the narrow side 26 are followed by a profile of projections 27, 28 and recesses 29, 30. Here, the particular projection 27, 28 of the particular side wall 10, 13 engages into an offset 30, 29 of the opposite side wall 13, 10. The projections 27, 28 are constructed in such a manner that they do not overlap with an area of the opposite side wall but rather only engage in offsets 29, 30 provided there.

In the exemplary embodiment shown in the FIGS. the first side 4 and the second side 5 each have a flat base body. It can be recognized in FIG. 1 that the otherwise flat base body 4 has a small elevation 31. This clarifies that fact that the understanding of the concept "flat base body" used in the framework of this description, which provides a geometrically exactly flat base body only in an especially preferred embodiment, but in other embodiments—such as here—such base bodies can also be designated as "flat base bodies" which deviate from a geometrically exactly flat shape due to small projections.

In the exemplary embodiment shown in the FIGS. the flat base body of the first side 4 stands at an angle of 90 degrees from the flat base body 9 of the first wall 10. The flat base body of the second side 5 stands at an angle of 90 degrees from the flat base body 12 of the second side wall 13. The first side wall 10 and the second side wall 13 are aligned with one another (their outwardly facing surfaces are in a plane). The embodiment shown in the FIGS. comprises four clip surfaces 40, 41, 42, 43. Each clip surface is part of a flexible element passing through a recess 44, 45, 46, 47 located in the particular transition between the side 4, 5 and the first side surface 10, the second side surface 13, the third side surface 50 and the fourth side surface 51. The particular elastic element comprises a bevel 48 which brings it about that the lacking element comes in contact with the hole edge when the clip is introduced into a hole of an element and is pressed inward by the further pushing into the clip counter to the resilient force, but after having passed through the hole in the element it springs outward again on account of the resilient force and as a result extends behind the corresponding element.

The clip surfaces 40, 41, 42, 43 face the head 1. The head comprises four head surfaces 55, 56, 57, 58 which face the clip surfaces 40, 41, 42, 43. The first element and the second element are held between the clip surfaces 40, 41, 42, 43 and the head surfaces 50, 56, 57, 58 and as a result the second element is fastened on the first element.

The head 1 has a side surface 100 and the contact surface (head surface) 55 facing the tip 2, wherein the side surface 100 of the head merges via a first rounded edge 101 into the contact surface 55 of the head and facing the tip 2, and the first side 3 merges via a second rounded edge 102 into the first side wall 10, and the first rounded edge 101 merges via an arched section 103 into the second rounded edge 102. The contact surface 55 of the head 1, which contact surface faces the tip 2, merges via an arched section 104 into the first side wall 10.

The invention claimed is:

1. A clip for fastening a first element to a second element, the clip comprising:
   a head and a tip, wherein a longitudinal axis extends from the head to the tip, and
   a first side and a second side, wherein the first side extends from the head in the direction of the tip and the second side extends from the head in the direction of the tip,
   wherein a first side wall extends from the first side in the direction of the second side and a second side wall extends from the second side in the direction of the first side,
   wherein the first side wall comprises a first protruding finger which overlaps an area of the second side wall,
   wherein the first side wall comprises a second protruding finger which overlaps an area of the second side wall,
   wherein the first side wall comprises a flat base body having an outwardly facing surface, the first protruding finger is constructed to be aligned with the base body, and the first protruding finger has an outwardly facing surface that is in a plane with the outwardly facing surface of the base body of the first side wall,
   wherein a narrow side of the base body of the first side wall faces the second side wall, and that the second side wall comprises a flat base body having an outwardly facing surface extending in a plane, wherein a narrow side of the base body of the second side wall faces the first side wall, wherein the narrow side of the first side wall and/or the narrow side of the second side wall are at least level in sections,
   wherein the narrow side of the base body of the first side wall and the narrow side of the base body of the second side wall are arranged in the same plane,
   wherein the second side wall has a receptacle for receiving the first protruding finger, and the receptacle is a depression in the base body of the second side wall,
   wherein the narrow side of the first side wall extends in a plane which runs parallel to the longitudinal axis,
   wherein the second protruding finger has an end section extending parallel to the flat base body of the second side wall, whereby the end section of the second protruding finger has an outwardly facing surface extending in a plane, which extends parallel to the plane of the outwardly facing surface of the flat base body of the second side wall, and
   wherein the second protruding finger has a bent section present between the flat base body of the second side wall and the end section of the second protruding finger, whereby the bent section of the second protruding finger is configured as a double bent which is first bent in a first direction and is then bent in the further course in another direction.

2. The clip according to claim 1, wherein the second side wall comprises a protruding finger which overlaps an area of the first side wall.

3. The clip according to claim 1, wherein the first protruding finger overlaps an area of the base body of the second side wall which borders the level section of the narrow side of the second side wall, and/or the second protruding finger overlaps another area of the base body of the second side wall which borders the level section of the narrow side of the second side wall.

4. The clip according to claim 1, wherein a bent section is provided on an end of the first side, wherein the vertex of the bent section on the end of the first side forms a part of the tip of the clip, and/or that a bent section is provided on an end of the second side, wherein the vertex of the bent section forms a part of the tip of the clip on the end of the second section.

5. The clip according to claim 1, wherein the first side has a flat base body which extends from the head in the direction of the tip, and the flat base body of the first side wall stands at an angle to the flat base body of the first side, and/or the second side has a flat base body which extends from the head in the direction of the tip, and the flat base body of the second side wall stands at an angle to the flat base body of the second side.

6. The clip according to claim 5, wherein the flat base body of the first side is aligned parallel to the flat base body of the second side.

7. The clip according to claim 1, further including a clip surface which protrudes from the first side and is at a distance from the head and faces the head.

8. The clip according to claim 7, further including a head surface which faces the clip surface.

9. The clip according to claim 1, wherein the head and the first side and the first side wall and the second side and the second side wall are all part of a one-piece element produced by bending sections of a metallic section.

10. A device with a first element and a second element fastened to the first element, wherein the first element has a hole and the second element is fastened by a clip according to claim 1 to the first element, wherein the clip extends through the hole in such a manner that the head of the head is arranged on one side of the first element and the tip of the tip is arranged on the opposite side of the element.

11. A clip for fastening a first element to a second element, the clip comprising:

a head and a tip, wherein a longitudinal axis extends from the head to the tip, and a first side and a second side, wherein the first side extends from the head in the direction of the tip and the second side extends from the head in the direction of the tip, wherein a first side wall extends from the first side in the direction of the second side and a second side wall extends from the second side in the direction of the first side, wherein the first side wall comprises a flat base body and a first protruding finger, the base body having an outwardly facing surface, the first protruding finger overlapping an area of the second side wall, the first protruding finger being aligned with the base body, and the first protruding finger has an outwardly facing surface that is in a plane with the outwardly facing surface of the base body of the first side wall, wherein the first side wall comprises a second protruding finger which overlaps an area of the second side wall, wherein a narrow side of the base body of the first side wall faces the second side wall, and that the second side wall comprises a flat base body having an outwardly facing surface extending in a plane, wherein a narrow side of the base body of the second side wall faces the first side wall, wherein the narrow side of the first side wall and/or the narrow side of the second side wall are at least level in sections, wherein the narrow side of the base body of the first side wall and the narrow side of the base body of the second side wall are arranged in the same plane, wherein the second side wall has a receptacle for receiving the first protruding finger, and the receptacle is a depression in the base body of the second side wall, wherein the narrow side of the first side wall extends in a plane which runs parallel to the longitudinal axis, wherein the second protruding finger has an end section extending parallel to the flat base body of the second side wall, whereby the end section of the second protruding finger has an outwardly facing surface extending in a plane, which extends parallel to the plane of the outwardly facing surface of the flat base body of the second side wall, and wherein the second protruding finger has a bent section present between the flat base body of the second side wall and the end section of the second protruding finger, whereby the bent section of the second protruding finger is configured as a double bent which is first bent in a first direction and is then bent in the further course in another direction.

12. The clip according to claim 11, wherein the second side wall comprises a protruding finger which overlaps an area of the first side wall.

* * * * *